United States Patent Office 3,301,580
Patented Jan. 31, 1967

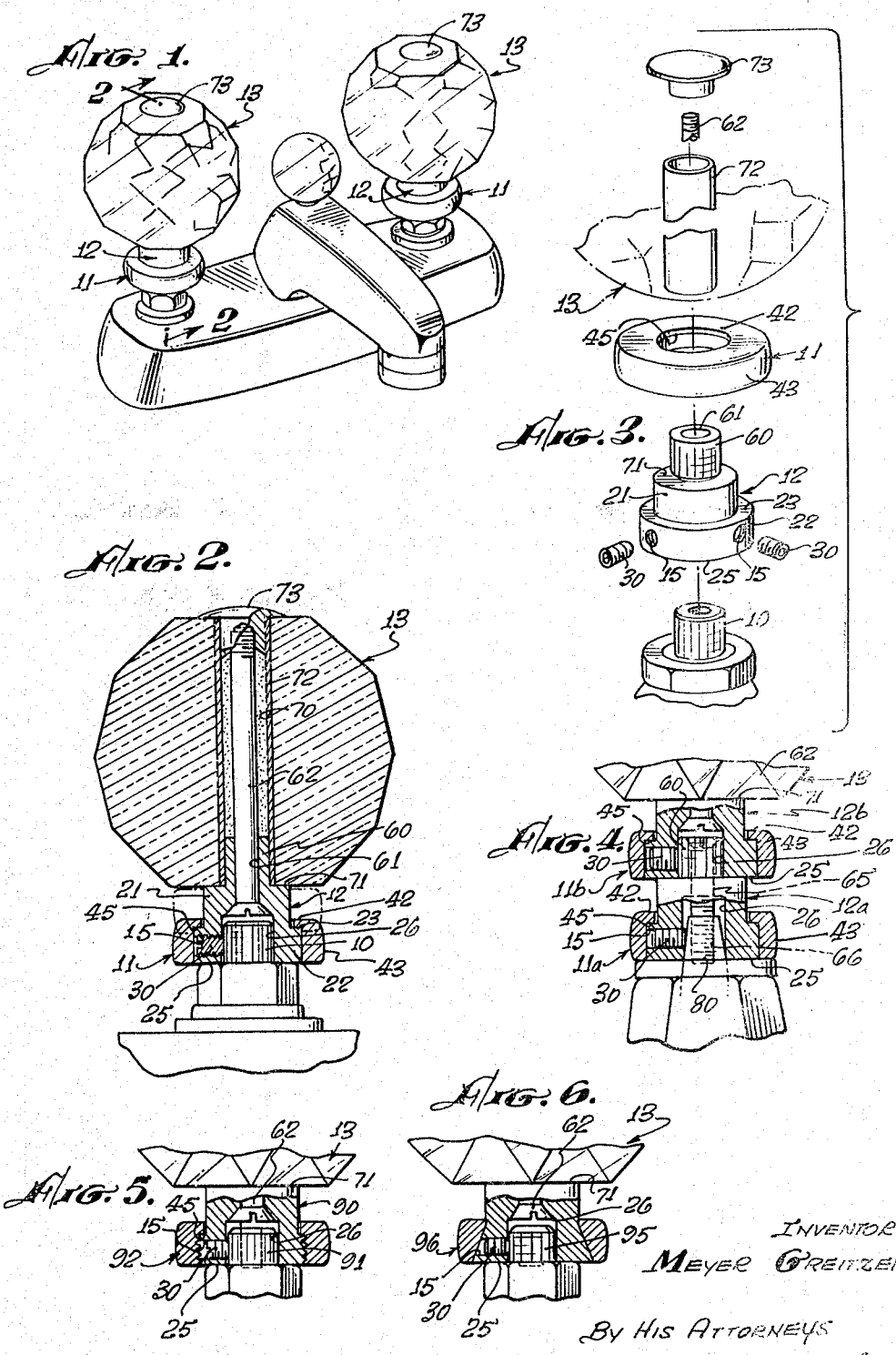

3,301,580
WATER FAUCET HANDLE
Meyer Greitzer, 2011 S. Garth Ave.,
Los Angeles, Calif. 90034
Filed Oct. 19, 1964, Ser. No. 404,713
1 Claim. (Cl. 287—53)

This invention relates to securing handles to valves. More particularly, this invention relates to an improved manner of securing and replacing handles on valves which are manually operated and in observable locations, as for example in household kitchen and lavatory sinks.

The typical manner of securing a valve handle to its correlative valve stem provides a mating configuration, with the valve stem being the male portion and the valve handle including a female portion. Often the valve stem is male threaded and the mating portion of the handle is female threaded. Another common example provides a valve stem which is splined and a mating splined portion is defined in the handle. Other examples use rectangular and hexagonal mating portions. Obviously, a multitude of variations are possible and in fact the industry supplies innumerable valve stem-handle mating combinations.

Because valves often have different mating arrangements for securing handles thereto, replacement of handles for decorative or convenience purposes is difficult and often it is impossible to find a replacement handle for the particular purpose at hand.

One solution to this problem is presently available in the art: the typical setscrew handle. In this type of handle, the handle has proximate its lower end a tubular section whose inside diameter is made sufficiently large to fit over the valve stems that are likely to be encountered no matter what the shape of the valve stem. Of course, when the inside diameter is this large, the handle fits to the valve stem relatively loosely. One or more setscrews are provided to secure the handle tightly to the valve stem. Naturally, since each valve stem is likely to be different in size, the setscrew must be sufficiently long to insure adequate securing of the handle to the valve stem. In most cases, therefore, the setscrew protrudes beyond the peripheral surface of the handle tubular section in which it is threaded. This protrusion of the setscrew is unsightly, especially in valves used, for example, in kitchen and bathroom fixtures, and in other installations where it is desired that the fixtures present an overall attractive appearance. Another major disadvantage of the setscrew type installation as presently available is that when the handle is firmly grasped, often the fingers or palm will contact the protruding setscrew head and the hand may be cut or scratched, often dangerously, especially if the setscrew is rusty or otherwise corroded.

Another disadvantage of the setscrew handle results when the valve is used in an adverse environment such as, for example, an ordinary household kitchen sink where the surface parts of the valve encounter splashing soap, cleanser, water, and food particles among other things. Often foreign matter will be dissolved or suspended in water and will travel through the threaded setscrew hole and thereupon flow down the valve stem into the valve mechanism and result in corrosion and eventual failure of the valve mechanism.

The invention described herein incorporates all of the advantages of the setscrew handle without any of the attendant disadvantages.

Accordingly it is an object of this invention to provide a valve handle which can be used on a wide variety of valve stems.

It is another object of this invention to provide a valve handle which is decorative and yet easily attachable to a valve stem.

Yet another object of this invention is to provide a valve handle that can be firmly grasped manually without possibility of cutting or scratching the hand.

A further object of this invention is to provide a valve handle which effectively keeps foreign matter from entering the valve mechanism through openings in the valve handle.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

FIGURE 1 is a perspective view of a faucet utilizing a preferred embodiment of a valve handle securing apparatus constructed in accordance with the described invention;

FIGURE 2 is a cross-sectional view of the handle securing apparatus taken along line 2—2 of FIGURE 1;

FIGURE 3 is an exploded perspective view of the securing apparatus parts as shown in FIGURE 2;

FIGURE 4 is a cross sectional view of an embodiment of the present invention utilizing two handle stems necessary because of tapered valve stems;

FIGURE 5 is a fragmentary cross sectional view of another possible embodiment constructed in accordance with the invention utilizing a threaded sleeve and handle stem; and, FIGURE 6 is a fragmentary cross sectional view of another embodiment utilizing a tapered sleeve and handle stem.

Referring to FIGURE 1, the apparatus that secures the handle to the valve stem 10 is therein shown to comprise a sleeve 11 and a handle stem 12. The handle stem 12 provides the connecting link between the handle 13 and the valve stem 10 through the use of Allen head screws 30. The sleeve 11 covers the Allen screw opening 15 to create an attractive appearance and also to provide a reasonably effective shield to dirt that would otherwise come through the screw opening 15.

The drawing describes the presently preferred embodiment of the invention. It is to be noted that many variations of the invention are readily foreseen, and thus the preferred embodiment is only one of many available examples describing the invention, which resides primarily in a setscrew or other comparable fastening attachment of the handle to the valve stem and a covering sleeve 11 over the handle stem 12.

Referring again to the drawing, the handle stem externally comprises an upper cylindrical portion 21 and a lower cylindrical portion 22. The lower cylindrical portion 22 is of substantially greater diameter than the upper cylindrical portion 21 so that a transverse shoulder 23 is defined. Extending upward from the bottom surface 25 of the handle stem 12 is a cylindrical cavity 26. The cavity 26 is of sufficiently great diameter to clear the stem 10 of the valve. The cavity 26 diameter in the presently preferred embodiment is ⅜ inch, which is sufficient to clear the valve stems of most valves presently in use in homes, offices, and other places where decorative faucets and valves are desired.

Female threaded holes 15 extend transversely through the lower portion 22 of the handle stem 12 to the inner surface of the cavity 26 and Allen screws 30 are provided in the holes 15 to secure the handle stem 12 to the valve stem 10. The screw 30 length is substantially the same as the length of the hole 15, so that when the screw is tightened, the head is recessed below the external surface of the lower cylindrical portion 22 of the handle stem 12.

The sleeve 11 comprises an upper portion 42 and a lower portion 43. The inside diameter of the upper portion 42 is substantially the same but greater than the diameter of the upper portion 21 of the handle stem 12; the inside diameter of the lower portion 43 is substantially the same but greater than the diameter of the lower portion 22 of the handle stem 12 so that a downward and inward facing transverse shoulder 45 is defined in the sleeve 11. In assembly of the securing apparatus, the sleeve 11 is slidably fitted over the handle stem 12 so that the shoulder 45 of the sleeve 11 is in bearing engagement with the shoulder 23 of the handle stem 12.

To secure the handle stem 12 to the valve stem 10, the sleeve 11 is upwardly slided by a sufficient distance $d$ to clear the Allen screw holes 15 as indicated by the dotted lines in FIGURE 2. The Allen screw can then be tightened and then the sleeve 11 slides down to cover the holes 15 as hereinabove described. The external surface of the sleeve 11 is arcuate in the preferred embodiment; however, this surface can be varied to suit any decorative purpose.

The handle 13 may then be attached to the handle stem 12. In the pictured embodiments, the handle stem 12 is provided with a cylindrical superstructure 60. A vertical hole 61 is drilled extending from the top of cavity 26 through the superstructure 60. A screw 62 is inserted in the hole 61 to attach the handle 13 to the handle stem 12.

The head of screw 62 is in bearing engagement with the top surface 41 of the valve stem 10; however, it should be noted that the bearing surface in the preferred embodiment is the bolt head but any single point contact would be sufficient since the screws 30 provide the primary securing of the handle stem 12 to the valve stem 10.

In the preferred embodiment, the sleeve is chrome plated for decorative use; however, any plating or covering can be used to enhance the appearance of the invention or to protect the screws 30 from corrosion and rust. It can be readily observed that removing the handle assembly does not require disassembly of the handle 13 from the handle stem 12. Disassembly merely requires sliding the sleeve 11 upward to clear the screw holes 15 so that the screws 30 may be loosened and the handle stem 12 removed from the valve stem 10. Thus it can be seen that the handle stem 12 can be readily removed and another handle assembly installed. Also it is readily apparent that the invention provides a more decorative valve handle assembly because the screw holes 15 are covered by the sleeve, thereby eliminating the unsightly appearance of the screw holes 15 and the screws 30 that other setscrew handles display. It is further apparent that by proper design of the external surface of the sleeve 11, in the embodiment shown for example, this surface is arcuate, sharp edges and projections are covered so that when grasping the handle hands will not be injured. In addition, the sleeve 11 provides effective protection of the Allen screws and other parts of the valve as hereinabove described from dirt.

In the pictured embodiment, the handle 13 is made of crystal for decorative purposes. The superstructure 60 of the handle stem defines a transverse shoulder 71 with the upper portion 21 of the handle stem 12. A cylindrical hole 70 is drilled through the crystal and a metal tube 72 is placed within hole 70 and extends for the full height of the crystal. The screw 62 is threadably engaged with a decorative cap nut 73 to secure the crystal handle to the handle stem 12. To prevent the handle 13 from turning with respect to the handle stem 12, the tube 72, the screw 62, and the nut 73 are cemented into place with epoxy cement or some other strong cement. Although the handle is crystal, it is obvious that any suitable handle material and shape can be utilized without changing the nature of the invention. It is also clear that many other techniques of fastening the handle 13 to the handle stem 12 are available, such as cementing without any screws and without any superstructure provided in the handle stem 12.

Referring to FIGURE 4, an embodiment of the invention is shown that utilizes two handle stems 12a and 12b and two sleeves 11a and 11b of the same kind as described hereinabove. On some valves a severely tapered stem is used with a varying rectangular periphery along the length of the stem. Because of the tapered stem, the single setscrew 15 of the standard embodiment of the present invention is not sufficient to secure the handle stem 12 to the valve stem 10 with sufficient tightness to avoid slippage of the handle stem around the valve stem. Of course, the present invention can have a tapered cavity which is cooperatively shaped to the tapered valve stem to avoid this problem; however, for expediency and standardization in manufacture, two handle stems 12a and 12b may be utilized. The tapered valve stem has always a vertical threaded hole to allow attachment of the handles that are supplied with the valves. This hole provides a ready securing point for a handle stem 12. The superstructure 60 has vertically throughout a threaded hole of the same kind as in the tapered valve stem; a screw 65 engages this hole from the top thereof and projects down and is terminated in the threaded hole 66 of the tapered valve stem 80. The superstructure of this handle stem 12b is as described hereinabove cylindrical and thus can be easily secured to the handle stem 12a as hereinabove. Therefore, handle assemblies can be manufactured with the handle stem securely attached and cemented thereto and these assemblies can be secured to a tapered valve stem by the simple expedient of another handle stem 12b. No special parts are required.

Referring to FIGURE 5, another typical embodiment of the invention is shown. As can be readily seen, the handle stem 90 is secured to the valve stem 91 in the same manner as in the embodiment described above, i.e., using recessed setscrews. In this embodiment the handle stem 90 is male threaded and the sleeve 92 is correlatively female threaded so that the sleeve upon installation is threadably engaged with the handle stem 90. To install the apparatus it is only necessary to unthread the sleeve 92 until the setscrew holes are uncovered, tighten the setscrews and then rethread the sleeve to cover the holes and thus present an assembly with the advantages discussed hereinabove.

Referring to FIGURE 6, another embodiment of the invention is shown. In this embodiment, the handle stem 95 is cylindrically tapered with the lower part the greatest in diameter. The sleeve 96 is a tapered sleeve cooperatively fitted to the handle stem 95 so that the handle stem 95 and the sleeve 96 can be slidably engaged to create a wedged fit. This embodiment has all the attendant advantages discussed above with additional effectiveness, because of the tight fit of the sleeve 96, against splashed dirt and water.

In summary, this invention is a new type of valve handle securing apparatus comprising a handle stem which secures to the valve stem by setscrews which are recessed and a sleeve slidably fitted over the handle stem so that the screw holes are covered with the resultant advantages of attractiveness, safety, and protection from dirt.

Although this invention is described with a degree of particularity, it is understood that the present disclosure has been made only by way of example and that numerous changes in the details of construction may be resorted to without departing from the spirit and the scope of the invention as hereinafter claimed.

What is claimed is:

A valve handle securing apparatus comprising:
    a first handle stem, said stem having upper and lower cylindrical portions, said lower cylindrical portion having a substantially greater diameter than said upper portion, said upper portion and said lower portion defining a transverse shoulder;

said lower portion defining therein a cylindrical cavity extending upward from the lower surface of said lower portion, said lower portion defining a threaded hole radially therethrough to said cavity, a screw inserted in said hole whereby said handle stem can be secured to a stem of a valve;

a second handle stem like said first handle stem and with the upper portion of its cylindrical cavity being threaded;

two slidable sleeves, each of said sleeve having upper and lower portions, said upper portion having substantially the same inside diameter as the diameter of said upper portions of said handle stems, said lower portion of each of said sleeves having substantially the same diameter as said lower portion of said handle stems, said upper and lower portions of each of said sleeves defining a transverse shoulder; one of said sleeves being slidably fitted upon each of said handle stems and retained by said shoulders; and said sleeves being partially removable, whereby said sleeves can be slidably removed to provide access to said threaded holes without requiring disassembly of said securing apparatus;

said first handle stem being atop said second handle stem;

stem means projecting from said second handle stem and into said cylindrical cavity of said first handle stem, and the screw means of the first handle stem engaging and securing said stem means in said cylindrical cavity of said first handle stem.

References Cited by the Examiner

UNITED STATES PATENTS

| 1,150,689 | 8/1915 | Mahoney | 292—351 |
| 1,459,917 | 6/1923 | McCann. | |
| 1,825,264 | 9/1931 | Dexter | 292—351 |
| 1,878,569 | 9/1932 | Zolleis. | |

FOREIGN PATENTS 10,940  1884  Great Britain.

CARL W. TOMLIN, *Primary Examiner.*

A. V. KUNDRAT, *Assistant Examiner.*